US008625453B2

(12) United States Patent
Holm

(10) Patent No.: US 8,625,453 B2
(45) Date of Patent: Jan. 7, 2014

(54) AD-HOC NETWORK AND A METHOD FOR CONFIGURING THE AD-HOC NETWORK AND A MOBILE REPEATER TELEPHONE FOR USE IN THE AD-HOC NETWORK AND USE OF THE MOBILE REPEATER TELEPHONE

(76) Inventor: Poul Jørgen Holm, Nuuk (GL)

( * ) Notice: Subject to any disclaimer, the term of this patent is extended or adjusted under 35 U.S.C. 154(b) by 250 days.

(21) Appl. No.: 13/273,626

(22) Filed: Oct. 14, 2011

(65) Prior Publication Data

US 2012/0033574 A1 Feb. 9, 2012

Related U.S. Application Data

(63) Continuation-in-part of application No. PCT/IB2010/051714, filed on Apr. 19, 2010.

(30) Foreign Application Priority Data

Apr. 17, 2009 (EP) ..................................... 09158151

(51) Int. Cl.
 *H04W 24/00* (2009.01)
(52) U.S. Cl.
 USPC ......................................................... 370/252
(58) Field of Classification Search
 USPC ......................................................... 370/252
 See application file for complete search history.

(56) References Cited

U.S. PATENT DOCUMENTS

| 2002/0080750 A1 | 6/2002 | Belcea | 370/337 |
| 2002/0085526 A1 | 7/2002 | Belcea | 370/337 |
| 2002/0089945 A1 | 7/2002 | Belcea | 370/321 |
| 2002/0150075 A1 | 10/2002 | Belcea | 370/347 |
| 2003/0142638 A1 | 7/2003 | Belcea | 370/321 |
| 2003/0142645 A1 | 7/2003 | Belcea | 370/328 |
| 2003/0185166 A1 | 10/2003 | Belcea | 370/321 |
| 2004/0101037 A1 | 5/2004 | Meng | 375/220 |
| 2007/0103365 A1* | 5/2007 | Pande et al. | 342/357.15 |
| 2007/0253376 A1 | 11/2007 | Bonta et al. | 370/338 |
| 2010/0304756 A1* | 12/2010 | Yang | 455/456.1 |

FOREIGN PATENT DOCUMENTS

| EP | 1 179 896 A2 | 2/2002 |
| EP | 1 826 964 B1 | 8/2007 |
| WO | WO 01/11815 A1 | 2/2001 |

OTHER PUBLICATIONS

International Search Report, PCT/IB2010/051714, mailed Jun. 11, 2010.

* cited by examiner

*Primary Examiner* — Sulaiman Nooristany
(74) *Attorney, Agent, or Firm* — Winston & Strawn LLP

(57) ABSTRACT

An ad-hoc network that includes a plurality of telephones at least one of which is a mobile repeater telephone for establishing a first telephone connection line between a first caller telephone and a first receiver telephone, and for simultaneously establishing at least one second telephone connection line between a second caller telephone and a second receiver telephone. A subset of all the mobile repeater telephones in the network each have its own unique code and a subset of the unique codes are known to a subset of all mobile repeater telephones in the ad-hoc network. The mobile repeater telephones have a software program stored on the processors of the telephones or a database that is accessible by the telephones. The software program includes a geographic map in electronic form of the area of the network and includes data about topography and obstacles and how much the obstacles attenuate the signal.

20 Claims, 4 Drawing Sheets

AD-HOC NETWORK AND A METHOD FOR CONFIGURING THE AD-HOC NETWORK AND A MOBILE REPEATER TELEPHONE FOR USE IN THE AD-HOC NETWORK AND USE OF THE MOBILE REPEATER TELEPHONE

CROSS-REFERENCE TO RELATED APPLICATIONS

This application is a continuation-in-part of International Application no. PCT/IB2010/051714 filed Apr. 19, 2010, the entire content of which is expressly incorporated herein by reference thereto.

BACKGROUND

The present invention relates to an ad-hoc network of the kind comprising a plurality of telephones at least one of the plurality of telephones is a mobile repeater telephone for establishing a first telephone connection line between a first caller telephone and a first receiver telephone in the ad-hoc network, which at least one mobile repeater telephone is of the kind having at least one transmitter, at least one receiver, a processor, and at least one repeater for repeating a signal received and/or transmitted by the at least one mobile repeater telephone for establishing the at least one telephone connection line, wherein the at least one transmitter, the at least one receiver, and the at least one repeater simultaneously allow establishing at least one second telephone connection line between at least one second caller telephone and at least one second receiver telephone different from the first caller telephone and the first receiver telephone, respectively, and at least a subset of all the mobile repeater telephones in the ad-hoc network having its own unique code and at least a subset of all the unique codes of the mobile repeater telephones in the ad-hoc network being known to at least a subset of all mobile repeater telephones in the ad-hoc network.

In the following, the term "cellular telephone" is to be understood as a telephone that when calling or being called connects to or is connected to a cellular telephone antenna tower (base station antenna) and then further to the receiver telephone.

To call from one cellular telephone to another is expensive even though the cellular telephone users are very close to each other. This depends on that the signal between the cellular telephones must pass the cellular telephone antenna towers and use a cellular telephone operator's cellular telephone system. Apart from being expensive the necessity to use the cellular telephone antenna tower also has several other drawbacks. If e.g. the cellular telephone antenna tower breaks or the current supply to the cellular telephone antenna tower breaks the use of cellular telephones in the area surrounding that cellular telephone antenna tower is not possible outside the range of neighboring cellular telephone antenna towers. In sparsely populated areas where there are no cellular telephone antenna towers at all, the person to call can be very close and still not reachable by the cellular telephone. The same is true in rural areas where the cellular telephone antenna towers are far from each other. If the cellular telephone user walks down in a depression in the terrain it can be enough to lose the contact to the cellular telephone antenna tower and even though the other cellular telephone user is close the connection is lost. Finally in a catastrophe area, like after an earthquake or another natural disaster, all the cellular telephone antenna towers may be destroyed. One way to communicate is then over a walkie-talkie system. Over such a system the caller cannot choose destination and everybody will be interrupted in their work to listen to the message and loose time in their lifesaving efforts.

US patent application with application no. 2003/0142638A1 discloses mobile phones, which form an ad-hoc network and are also able to connect to a cellular tower and a cellular network. The mobile phones each have one set of connecting units consisting of a receiver, a repeater and a transmitter to receive and transmit telephone calls between other mobile phones of the ad-hoc network. The set of connecting units of a first mobile phone jumps from connecting a first call, to connecting the second call, to connecting the third call and so on until the set of connecting units has connected all telephone calls which uses the first mobile phone as a connecting node. Then the set of connecting units will again connect the first call, continue with the second call and so on. This jumping from one call to another means that the connecting unit must switch from one call to another which takes time. A land mobile satellite system with portable communication terminals (mobile telephone) with two transceivers is known from EP1179896. One of the transceivers is used for connecting to a conventional cellular mobile system via an antenna of the conventional cellular mobile system while the other transceiver is used to connect through mobile repeater stations to another portable communication terminal. The portable communication terminals are only used for telephone conversation and similar data traffic and the two transceivers do not comprise repeaters to increase the signal-to-noise ratio and thus the portable communication terminals cannot be used as repeaters for connecting other portable communication terminals. One portable communication terminal cannot communicate directly with another portable communication terminal. The communication between two communication terminals must pass through at least one mobile repeater station. The mobile repeater stations according to EP1179896 contain many transceivers, where each transceiver comprises a receiver, a repeater and a transmitter. However, the mobile repeater stations cannot be used as telephones. Each mobile repeater station is described in EP1179896 to need means for generating and storing electric power, such as a generator, which will be driven by a gasoline engine, or a fuel cell, or solar batteries to assure enough power supply to the mobile repeater station. This is due to the fact that the system depends on land-satellite contact which is highly energy demanding.

European patent application no. EP1826964A1 discloses a system where there is an ad-hoc network of mobile terminal devices, only. The mobile terminal devices in this network can be in any of three states. If two users talk to each other their respective mobile terminal devices are in a first state. If these two first mobile terminal devices are too far from each other to communicate directly with each other there are one or more second mobile terminal devices between the two first mobile terminal devices that are in a second or third state and act as intermediaries between the first two mobile terminal devices. There is a problem when the users of one of the intermediary second mobile terminal devices tries to make a call. Then the user's mobile terminal device will go over to the first state and not be able to connect a telephone call between the two first mobile terminal devices. The network has to find a new route between the two first mobile terminal devices. In an area where the mobile terminal devices are far from each other and there is no alternative connection route, the connection between the two first mobile terminal devices will break. The network will not be used efficiently.

In the system disclosed in US patent application no. US2007/0253376 every cellular telephone has two transceivers or two pairs of one transmitter and one receiver. The one pair of transmitter and receiver communicates with a regular cellular telephone network via the cellular telephone antenna towers, while the other pair of transmitter and receiver communicates with an ad-hoc network. A cellular telephone that connects to other cellular telephones in the ad-hoc network is still able to make a telephone call using the regular cellular telephone network, but the solution disclosed in US2007/0253376 does not solve the problem of at the same time both acting as an intermediary between other cellular telephones and calling another cellular telephone in e.g. a catastrophe area where there are no cellular telephone antenna towers at all.

Thus there is a need for an ad-hoc network of mobile phones which depend on only mobile phones to function. Furthermore there is a need for an ad-hoc network of mobile phones which may have the capacity to handle a large number of simultaneous conversations or heavy data traffic, with a minimum of delay in the transmissions between phones in the ad-hoc network and which is less vulnerable to local malfunctions of telephones in the ad-hoc network than previously known systems.

SUMMARY OF THE INVENTION

In a first aspect according to the present invention is provided a system of the kind mentioned in the opening paragraph that improves the use of an ad-hoc network.

In a second aspect according to the present invention is provided a system of the kind mentioned in the opening paragraph where each telephone in the ad-hoc network knows the telephone number and the position of the other telephones.

In a third aspect according to the present invention is provided a system of the kind mentioned in the opening paragraph that is suited for sparsely populated areas where there is no cellular network.

In a fourth aspect according to the present invention is provided a system of the kind mentioned in the opening paragraph that is specially suited for areas struck by a natural catastrophe.

In a fifth aspect according to the present invention is provided a system of the kind mentioned in the opening paragraph that is able to maintain a telephone call in a hilly surrounding.

The novel and unique features whereby these and other advantages is achieved according to the present invention wherein the mobile repeater telephones in the ad-hoc network have a software program stored on the processors of the mobile repeater telephones or on a database that is accessible by the mobile repeater telephones, wherein the software program: includes a geographic map in electronic form of the area of the ad-hoc network and includes data about the topography on the geographic map and has all the obstacles positioned on the geographic map and how much the obstacles attenuate the signal.

The first caller telephone and second caller telephone as well as the first receiver telephone and second receiver telephone can be one of the mobile repeater telephones that form the ad-hoc network, i.e. a first ad-hoc network. The first caller telephone and second caller telephone as well as the first receiver telephone and second receiver telephone can also be stationary telephones, cellular telephones, IP telephones, mobile repeater telephones that forms, or together with other mobile repeater telephones form, a second ad-hoc network, or the first caller telephone and second caller telephone as well as the first receiver telephone and second receiver telephone can be any combination of the stationary telephones, cellular telephones, IP telephones, and mobile repeater telephones. The second caller telephone and the second receiver telephones can be any of the mobile repeater telephones that transfer the established first telephone connection line. If any of the first caller telephone and second caller telephone as well as the first receiver telephone and second receiver telephone is a stationary telephone, a cellular telephones, or an IP telephone the connection to the first ad-hoc network is via a cellular telephone antenna tower. If any of the first caller telephone and second caller telephone as well as the first receiver telephone and second receiver telephone is a mobile repeater telephone that forms, or together with other mobile repeater telephones form, a second ad-hoc network the connections to the first ad-hoc network and to the second ad-hoc network are via one or more cellular telephone antenna towers.

Two mobile repeater telephones may be in direct connection when they both are on a flat, open field. However, in a different location the same two mobile repeater telephones may not be in direct connection if there are obstacles like mountains, ridges, pits, valleys, difference in altitudes, buildings, constructions, or walls etc. between the two mobile repeater telephones even if the telephones are located the same distance from each other. In these cases connection between the two mobile repeater telephones may be achieved via another route of mobile repeater telephones.

The software includes data about how much the obstacles on the geographic map attenuate the signal per length unit. The software also includes data about how the attenuation varies with the direction of the signal. The obstacle can be oblong so that the signal has to travel a longer distance through the obstacle in one direction compared to another. The obstacle can be so oblong that the wall does not at all influence the signal in one direction, parallel with the long side of the obstacle.

The software program can also comprise information about how the attenuation of the obstacles varies with wavelength. If the software program can see—when comparing the positions of two mobile repeater telephones in direct connection and where the two mobile repeater telephones are heading with the geographic map in electronic form—that an obstacle will be positioned between the two mobile repeater telephones that will attenuate the signal at the wavelength used, the software can direct the two mobile repeater telephones to communicate using another wavelength that is not attenuated as much by the obstacle.

BRIEF DESCRIPTION OF THE DRAWING FIGURES

The invention will now be described by way of example with reference to the accompanying drawing in which.

DETAILED DESCRIPTION OF THE INVENTION

Figure 1:
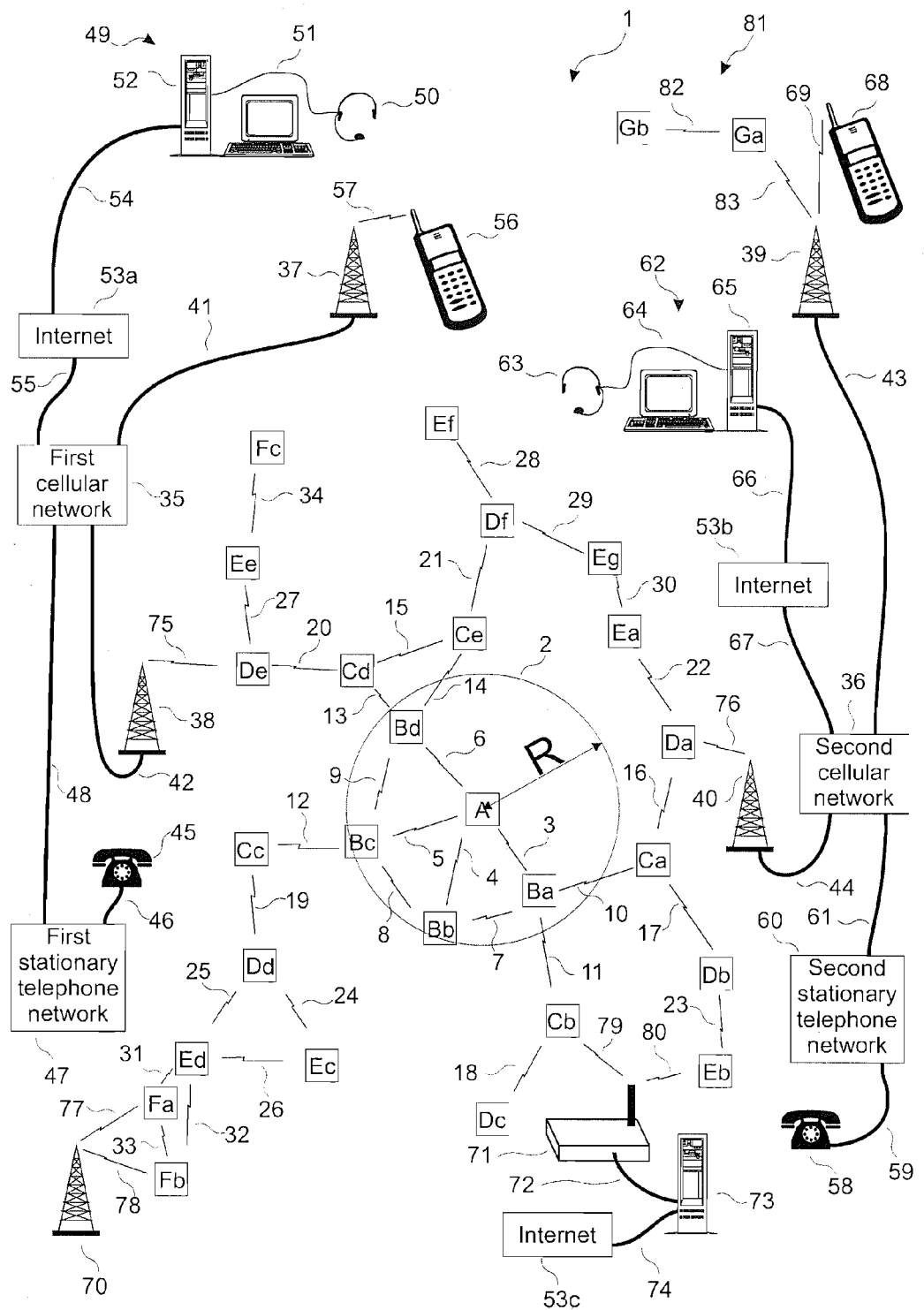
FIG. 1 shows a first embodiment of an ad-hoc network according to the present invention.

In the following, the term "dense" is to be understood as that each mobile repeater telephones in an ad-hoc network is in direct connection range to many other mobile repeater telephones.

In an area with a dense distribution of mobile repeater telephones, there are many possibilities to connect two mobile repeater telephones.

In the following, the term "direct connection range" is to be understood as two mobile repeater telephones that can communicate with each other without any connecting mobile repeater telephone in between.

In the following, the term "direct connection" is to be understood as two mobile repeater telephones that connect to each other and are in direct connection range of each other.

In the following, the term "neighbors" of a mobile repeater telephone is to be understood as the mobile repeater telephones to which the mobile repeater telephone is in direct connection.

The direct connection range is of course influenced by the topography like hills, valleys, etc. but also by buildings, walls etc. If two mobile repeater telephones that are in direct connection range to each other and that connect the first or the second telephone connection lines move away from each other and loose the direct connection there are many other mobile repeater telephones to which the first telephone call can be transferred to, so that the first or the second telephone connection lines are not broken. Mobile repeater telephones already communicating with other mobile repeater telephones and/or already connecting other telephone connection lines can also be used to connect the first telephone call.

In an area with a less dense distribution of mobile repeater telephones there are not so many possibilities to connect two mobile repeater telephones. In such an area it is extra important that all possibilities are utilized to establish and maintain telephone connection lines between the mobile repeater telephones. It is a big advantage to be able to utilize mobile repeater telephones already calling another telephone for connecting the two mobile repeater telephones. As a user it is also an advantage that even though the user's mobile repeater telephone is connecting two other mobile repeater telephones in the first telephone connection line the user's mobile repeater telephone is still able to establish the second telephone connection line in the ad-hoc network without breaking the first telephone connection line. A natural-disaster-struck area is an area where in many cases the cellular telephone antenna towers are broken and where the density of mobile repeater telephones is likely to be low. In such an area the communication between the rescuers can be a matter of life and death.

The mobile repeater telephone can have an indicator that shows the power of the signal in a certain direction. The indicator can be used to find the directions of the signal of the communicating mobile repeater telephones. A directed antenna can e.g. be used to direct the signal and increase the power-density of the transmitted signal to the other mobile repeater telephones. It is also possible to boost the power of the signal so that the connection range will be longer. That will be especially usable in an emergency situation.

It is the presence of the repeater, the receiver and the transmitter that enable a mobile repeater telephone of the present invention to connect the first telephone connection line and at the same time establish, receive, or connect other mobile repeater telephones in the second telephone connection line.

The set of receiver, transmitter and repeater in each Mobile repeater telephone can also be used for priority calls. This can for example be used in case of emergencies where traffic on the ad-hoc network is very high and thus possibly creating severe delay in some areas. A priority call may be a distress call from a specified rescue unit. Such a distress call may contain information to the mobile repeater telephones in the ad-hoc network to let the call have highest priority and thus minimizing delay on the call and ensuring maximum clarity of the call.

It is a big advantage that the set of receiver, transmitter and repeater is found in each mobile repeater telephone as the establishment of a functional ad-hoc network follows the users. E.g. as a team of rescue workers work their way through difficult terrain the ad-hoc network is established as they move forward without having to depend on stationary repeater stations or other repeater stations than the teams own mobile telephones for establishing contact with minimum delay.

It is also an advantage of the present invention that two mobile repeater telephones may be in contact with each other without any intermediate repeaters.

All in all this renders the system according to the present invention efficient and stabile enough to function without e.g. satellite connections, which in other systems are required to obtain other types of ad-hoc networks.

The fact that at least a subset of all the mobile repeater telephones in the ad-hoc network has its own unique code and at least a subset of all the unique codes of the mobile repeater telephones in the ad-hoc network are known to at least a subset of all mobile repeater telephones in the ad-hoc network and that not all mobile repeater telephones necessarily contains information about unique codes of all mobile repeater telephones in the entire ad-hoc network, makes it possible to update information in local parts of the ad-hoc network. E.g. it is possible to only update information in subsets of the ad-hoc network in which the updated information is relevant, thereby not having to stress and possibly increase delay in the over-all ad-hoc network by always implementing all alterations in unique codes on all mobile repeater telephones simultaneously.

A repeater mobile telephone according to the present invention may comprise one or more processors.

The repeater amplifies the signal and increases the signal-to-noise ratio.

The unique codes, which at least a subset of all the mobile repeater telephones in the ad-hoc network has and which are known to the other mobile repeater telephones, enable the mobile repeater telephones to find each other.

The at least one receiver and the at least one transmitter can be at least one transceiver.

In an advantageously embodiment of the ad-hoc network according to the present invention the unique code may be a telephone number. In this way the user will easily remember the code. There will not be a situation where all the codes are used up. The mobile repeater telephones may also have two telephone numbers. The first telephone number is the unique code and the second telephone number is used on the cellular network. The unique code may also be provided as e.g. a numeric code extending the telephone number, thereby enabling the caller to proceed either automatically or intentionally into the ad-hoc network in case the conventional network is not able to establish a telephone connection.

In a preferred embodiment of the ad-hoc network according to the present invention a telephone connection line comprises a plurality of mobile repeater telephones in a series wherein at least one of the plurality of mobile repeater telephones also is or is not part of different telephone connection branch lines.

There is a first telephone connection line between two mobile repeater telephones via one or more other mobile repeater telephones in a series. Each of the other mobile repeater telephones in the first telephone connection line receives the telephone call and transmits the telephone call to the next mobile repeater telephone in the first telephone connection line. At the same time the plurality of the mobile repeater telephones in a series connecting the first telephone connection line is able to connect a second telephone connection line. The second telephone connection line may be between two other telephones not part of the first telephone connection line, may be from one of the mobile repeater telephones in the first telephone connection line or may be to one of the mobile repeater telephones in the first telephone connection line. The plurality of the mobile repeater telephones in the first telephone connection line is not locked by the telephone call but free to connect or connect to other telephones. The ad-hoc network is utilized most efficiently.

In an embodiment of the ad-hoc network according to the present invention at least a subset of all the mobile repeater telephones in the ad-hoc network may act as serial or parallel transmitters of signal for establishing a telephone connection line.

There can be a first telephone connection line between two mobile repeater telephones via one or more other mobile repeater telephones in a series. At the same time there may be between the two mobile repeater telephones other possible telephone connection lines via one or more yet other mobile repeater telephones that are parallel to the first telephone connection line. The other possible telephone connection lines may be known to the two mobile repeater telephones. If the first telephone connection line breaks, one of the other possible telephone connection lines can take the place of the first telephone connection line and can connect the two mobile repeater telephones. Since the other possible telephone connection lines are already known to the two mobile repeater telephones the time between the breakage of the first telephone connection line and the establishment of one of the other possible telephone connection lines can be faster than if there were no parallel telephone connection lines.

In another embodiment of the ad-hoc network according to the present invention a telephone connection may be via Internet Protocol telephony via a station with a transmitter, a receiver, and a repeater connected to a computer or via Voice over Internet Protocol.

In an area where there are no or few cellular telephone antenna towers, the distance between a mobile repeater telephone and the nearest cellular telephone antenna tower may be too long to allow the mobile repeater telephones to connect outside the ad-hoc network.

Instead of calling outside the ad-hoc network via a cellular telephone antenna tower and a cellular network, the first or the second telephone connection line between a mobile repeater telephone and a telephone outside the ad-hoc network could be via a repeater with a receiver connected to a computer. Using Internet Protocol telephony the first or the second telephone connection line can be transferred worldwide.

To reduce costs the mobile repeater telephones can connect to the cellular network using Voice over Internet Protocol.

In yet another embodiment of the ad-hoc network according to the present invention the repeater connected to the computer may be a component in establishing a connection between the first or the second caller telephone and the first or the second receiver telephone. Using repeaters connected to computers to help bring connection between the first or the second caller telephone and the first or the second receiver telephone makes the ad-hoc network denser and increases the size of the ad-hoc network.

The at least one mobile repeater telephone may have a PS receiver (positioning system receiver) that may receive information about the position of the PS receiver. The PS receiver may use a GNSS (Global Navigation Satellite System) like the GPS, the European Galileo positioning system, the Russian GLONASS, the Chinese COMPASS navigation system, or any other satellite based positioning system. A land-based positioning system like but not restricted to LORAN (Long Range Aid to Navigation) may also be used.

If the at least one mobile repeater telephone has a PS receiver then the PS receiver will tell the user where the mobile repeater telephone is. The position of one mobile repeater telephone can also or instead be determined by the position of the neighbors of the at least one mobile repeater telephone. That is, the at least one mobile repeater telephone must be located in the area that is covered by all the neighbors.

The at least one mobile repeater telephone can send information about its own position to a digital centre or a central office. The information can be sent in the form of a short-message-service (SMS) message via the other mobile repeater telephones in the ad-hoc network. The information can be sent at a fixed interval like every day, every hour, every 15 minutes or every minute depending on settings preprogrammed or chosen by a user.

The at least one mobile repeater telephone can have means to use the software "SMS my position".

The positioning determination might be useful in an emergency situation like after an earthquake or after an avalanche to locate individuals stuck under debris or snow. The information about the position is then sent to a rescue centre. When the rescue centre has received the information about the position of a mobile repeater telephone a confirmation of the reception may be sent to the particular mobile repeater telephone. The mobile repeater telephone can continue sending information about the position until the mobile repeater telephone receives a confirmation of the receipt from rescue centre. If the mobile repeater telephone is moved the mobile repeater telephone can be sending information about the new position of the mobile repeater telephone. The knowledge about the positions of the mobile repeater telephones will help to locate the individuals stuck under debris or snow and help save lives.

The mobile repeater telephones can comprise active or passive Radio-frequency identification (RFID) tags. If passive RFID tags are used an interrogating signal powers the tag and the tag replies by sending a signal that might be unique for the mobile repeater telephone. By using a detector the direction and strength of the reply signal can be measured and a relatively accurate estimation of the position of the tag and the stuck individual can be made.

In another embodiment of the ad-hoc network according to the present invention the unique code and the position according to the PS receiver of at least a subset of all the mobile repeater telephones may be known by at least a subset of the mobile repeater telephones. The position according to the PS receiver and unique code of each mobile repeater telephone may be distributed to the mobile repeater telephones in the ad-hoc network. In this way, each mobile repeater telephone knows where the other mobile repeater telephones in the ad-hoc network are. Each mobile repeater telephone also knows which connection lines there are to a certain mobile repeater telephone and through which other mobile repeater telephones to connect. That each mobile repeater telephone knows how to connect to the other mobile repeater telephones makes the connection much faster. That each mobile repeater telephone knows all possible ways to connect to the other mobile repeater telephones enables the first or the second telephone connection line to continue along other mobile repeater telephones if any of the mobile repeater telephones in the connection line drops out.

Two mobile repeater telephones may be in direct connection when they both are on a flat, open field. However, in a different location the same two mobile repeater telephones may not be in direct connection if there are obstacles like mountains, ridges, pits, valleys, difference in altitudes, buildings, walls etc. in the location even if the telephones are located the same distance from each other. In these cases connection between the two mobile repeater telephones may be achieved via another route of mobile repeater telephones.

The mobile repeater telephones in the ad-hoc network may have a software program stored on their processors or on a database that is accessible by the mobile repeater telephones. The software program includes a geographic map in electronic form of the area of the ad-hoc network. The software program also includes data about the topography on the geographic map and has all the obstacles positioned on the geographic map and how much the obstacles attenuate. The geographic map in the software program may be compared to the positions of the mobile repeater telephones according to the PS receiver. The software may give information about whether two mobile repeater telephones are in direct connection or not. At least one mobile repeater telephone can comprise means to ensure that if the calculations show that a break will probably occur in 15 minutes, in 10 minutes, in 5 minutes, in 2 minutes, in 1 minute, or in 30 seconds etc. the mobile repeater telephone may connect to another mobile repeater telephone and in that way maintain the conversation before a break in the connection occurs. This can be very important for e.g. a call from or to a rescue unit, like a distress call. Especially, if the rescue unit has to be guided during the traveling to the hurt and injured persons just after an earthquake, or another natural disaster, where the entire cellular telephone antenna towers are destroyed, it is important that the telephone connection is kept so that the rescue unit does not need to stop and wait for connection before they can get information about the direction and continue.

When the information about the position and unique code of each mobile repeater telephone is distributed to the other mobile repeater telephones in the ad-hoc network, the distributed information may also contain information about the neighbor mobile repeater telephones that each mobile repeater telephone directly connects to.

When at least the first or second caller telephone tries to connect to the at least first or second receiver telephone there may be a connection message sent. The connection message may include the unique codes of the caller telephone as well as of the receiver telephone and through which mobile repeater telephones the connection should be directed.

The connection message may include information relating to other possible connections through other mobile repeater telephones. This is an advantage in the event that the connection between two mobile repeater telephones is interrupted or breaks. In this case the two connected mobile repeater telephones has information relating to other known connections through other mobile repeater telephones enabling them to connect quickly around the interrupted or broken connection.

In another embodiment of the ad-hoc network according to the present invention the mobile repeater telephones may communicate as half-duplex devices (walkie-talkies). In an emergency situation where it is more important to get help than from whom the help is received it is better to connect to anybody nearby immediately. All members or a selected group of all members may be called at the same time. A selected group could be all physicians. The possibility to receive a walkie-talkie call may be switched off by the user.

The invention also relates to a method for configuring an ad-hoc network with mobile repeater telephones where the unique code of at least a subset of at least one mobile repeater telephone already in the ad-hoc network is made known to a mobile repeater telephone to be introduced into the ad-hoc network and the unique code of the at least one mobile repeater telephone to be introduced into the ad-hoc network is made known to at least a subset of all mobile repeater telephones already in the ad-hoc network.

Every mobile repeater telephone to be introduced into the ad-hoc network is assigned a unique code. The unique code of the mobile repeater telephone to be introduced is made known to the mobile repeater telephone already in the ad-hoc network e.g. by a SMS message or a file in the form of an update sent to all mobile repeater telephones in the ad-hoc network. The list of unique codes is always up to date for all mobile repeater telephones in the ad-hoc network.

In an advantageously embodiment of the method for configuring the ad-hoc network according to the present invention the mobile repeater telephone neighbors of at least a subset of mobile repeater telephones already in the ad-hoc network are made known to a mobile repeater telephone to be introduced into the ad-hoc network and mobile repeater telephone neighbors of the mobile repeater telephone to be introduced into the ad-hoc network is made known to at least a subset of all mobile repeater telephones already in the ad-hoc network.

To know the neighbors of each mobile repeater telephone enables fast establishments of telephone connections between the mobile repeater telephones. To know the neighbors of each mobile repeater telephone also enables that alternative telephone connection routes can be known. If the established telephone connection is broken, e.g. because two mobile repeater telephones in the telephone connection are too far away from each other, then a new telephone connection is established around the break.

In yet a preferred embodiment of method according to the method for configuring an ad-hoc network as described above, two mobile repeater telephones that are neighbors and loose direct contact with each other or two mobile repeater telephones that are not neighbors and establish direct contact with each other may be made known to at least a subset of all mobile repeater telephones in the ad-hoc network the unique codes of the two mobile repeater telephones and whether the two mobile repeater telephones have lost or have established direct contact with each other.

It may be important to update the ad-hoc network as fast as possible. Every change in the relative positions of the mobile repeater telephones, their neighbors and the unique codes of the mobile repeater telephones that have changed places might be made known to preferably all of the mobile repeater telephones in the ad-hoc network. The mobile repeater telephones in the ad-hoc network will be used most efficiently.

The invention also relates to a mobile repeater telephone for use in the ad-hoc network described above where the mobile repeater telephone has at least two transmitters, at least two receivers, a processor, and at least two repeaters, and the mobile repeater telephone knows at least one unique code and the position of at least a subset of all substantially similarly configured mobile repeater telephones in the ad-hoc network.

The processor of the first mobile repeater telephone controls the transmitters, the receivers, and the repeaters of the first mobile telephone so that a first signal from the first caller telephone or from a previous mobile repeater telephone in the first telephone connection line can be received by one of the receivers of the first mobile receiver telephone. The first signal is amplified and reduced of noise by one of the repeaters and then transmitted by one of the transmitters to the next mobile repeater telephone in the first telephone connection line or to the first receiver telephone. A second signal from the second caller telephone or from a previous mobile repeater telephone in the second telephone connection line is received by the at least other receiver controlled by the processor of the first mobile receiver telephone. The second signal is amplified and reduced of noise by the at least other repeaters and transmitted by the at least other transmitter controlled by the processor of the first mobile receiver telephone to the next mobile repeater telephone in the second telephone connection line or to the second receiver telephone.

The first signal from the caller telephone may come from a cellular telephone antenna tower or from another mobile repeater telephone. If possible the same receiver and the same transmitter are used in both cases. It is also possible that the difference in frequency of the carrier waves of the ad-hoc network and of the cellular network is outside the frequencies, which the transmitter can transmit and the receiver can receive. Then at least one pair of transmitter and receiver is used for receiving and transmitting telephone calls from and to cellular telephone antenna towers and at least one pair of transmitter and receiver is used for receiving and transmitting telephone calls from and to the ad-hoc network.

Instead of connecting the second telephone connection line between the second caller telephone and the second receiver telephone the second telephone connection line begins with or ends with the first mobile repeater telephone. Then the second signal begins at a microphone of the first mobile repeater telephone and is transmitted onto the ad-hoc network by the transmitter or, alternatively, the second signal is received from the ad-hoc network by the receiver and ends at a loudspeaker of the first mobile repeater telephone.

In an advantageously embodiment of the mobile repeater telephone, either the ad-hoc network or the mobile repeater telephone or both have a database of at least a subset of the unique codes, positions and neighbors of the mobile repeater telephones in the ad-hoc network.

A database with the unique codes, positions and neighbors of preferably all mobile repeater telephones in the ad-hoc network and where the database may continuously be updated, enables the information to always be recovered if the ad-hoc network goes down, a mobile repeater telephone has to be formatted or the information about the unique codes, positions and neighbors of preferably all mobile repeater telephones are lost. Afterwards the information on the database about the unique codes, positions and neighbors of preferably all mobile repeater telephones in the ad-hoc network may be sent to and stored on the mobile repeater telephones again.

The invention relates to the use of a mobile repeater telephone as described above in an ad-hoc network as described above.

The invention also relates to the use of a mobile repeater telephone as described above where the unique code, position and neighbors of at least a subset of all the mobile repeater telephones are made known to at least a subset of all mobile repeater telephones in the ad-hoc network with uniform or non-uniform intervals.

The unique codes, positions and neighbors of at least a subset of all the mobile repeater telephones can be made known to at least a subset of all mobile repeater telephones now and then. The information about the unique codes, positions and neighbors is sent to at least a subset of the mobile repeater telephones as e.g. an SMS message or a file in the form of an update. The information can also be sent to a database to which at least a subset of the mobile repeater telephones has access. The information can be sent at an interval with the same frequency as at which the position of the GPS receiver is updated, which is approximately 1 Hz or more. To save battery capacity of the mobile repeater telephones the interval can have a lower frequency. The update frequency can be changed from a centre or central office.

The ad-hoc network can also be of the kind comprising a plurality of telephones at least one of the plurality of telephones is a mobile repeater telephone for establishing a first telephone connection line between a first caller telephone and a first receiver telephone in the ad-hoc network, which at least one mobile repeater telephone is of the kind having a first transmitter, a first receiver, a processor, and a first repeater for repeating a signal received and/or transmitted by the at least one mobile repeater telephone for establishing the at least one telephone connection line, wherein at least one mobile repeater telephone has at least one second transmitter, at least one second receiver, and at least one second repeater for simultaneously allowing establishing at least one second telephone connection line between at least one second caller telephone and at least one second receiver telephone different from the first caller telephone and the first receiver telephone, respectively, and at least a subset of all the mobile repeater telephones in the ad-hoc network having its own unique code and at least a subset of all the unique codes of the mobile repeater telephones in the ad-hoc network being known to at least a subset of all mobile repeater telephones in the ad-hoc network.

It is the presence of the repeaters and the extra receivers and transmitters that enable the mobile repeater telephones of the present invention to connect the first telephone connection line and at the same time establish, receive, or connect other mobile repeater telephones in the second telephone connection line. The second transmitter can be the first transmitter and the second receiver can be the first receiver.

Having more than one set of receiver, transmitter and repeater in each mobile repeater telephone ensures that optimal communication with low delay and high sound quality in the ad-hoc network can be established. If only one set of receiver, transmitter and repeater is present in each mobile repeater telephone, the transmitter and receiver must switch between the multiple phone connections repeated by the phone, which creates a delay in the communication between callers and receivers.

If a telephone call is established by means of several mobile repeater telephones in series the delay caused by switching between telephone connections in each mobile repeater telephone may accumulate, making conversation hard or in severe cases impossible. I.e. the signal sent from one telephone to another telephone via mobile repeater telephones will be delayed for every mobile repeater telephone that transfers the signal possibly destroying the telephone connection.

Therefore it is an advantage that the delay in each repeater telephone is as short as possible as even a small delay may be important. As described this may be achieved by having more than one set of receiver, transmitter and repeater in each mobile repeater telephone.

Compared to prior art, each set of receiver, transmitter and repeater in the mobile repeater telephones of the present invention has fewer signals to transmit. The use of multiple sets of receiver, transmitter and repeater in each mobile repeater telephone ensures a larger capacity of telephone connections transmitted via each mobile repeater telephone without delay or at least with minimized delay.

Having multiple sets of receiver, transmitter and repeater in each mobile repeater telephone also allows for allocating a set of receiver, transmitter and repeater in one or more mobile repeater telephones for priority calls. This can for example be used in case of emergencies where traffic on the ad-hoc network is very high and thus possibly creating severe delay in some areas. A priority call may be a distress call from a specified rescue unit. Such a distress call may contain information to the mobile repeater telephones in the ad-hoc network to let the call pass on an unshared set of receiver, transmitter and repeater in each mobile repeater telephone and thus minimizing delay on the call and ensuring maximum clarity of the call. At least some of the mobile repeater telephones in the ad-hoc network may even have sets of receiver, transmitter and repeater permanently allocated for such priority calls.

It is a big advantage that the multiple sets of receiver, transmitter and repeater are found in each mobile repeater telephone as the establishment of a functional ad-hoc network follows the users. E.g. as a team of rescue workers work their way through difficult terrain the ad-hoc network is established as they move forward without having to depend on stationary repeater stations or other repeater stations than the teams own mobile telephones for establishing contact with minimum delay.

The multiple sets of receiver, transmitter and repeater in each mobile repeater telephone furthermore allow communication on multiple wavelengths. This may for example be used to transmit a distress call which may be transmitted on several wavelengths simultaneously—e.g. one wavelength for each set of receiver, transmitter and repeater.

That each mobile repeater telephone has at least two sets of receiver, transmitter and repeater has the advantage that if one set of a mobile repeater telephone malfunctions the mobile repeater telephone will still be able to be a connecting link between two other telephones. If an area is not dense but on the contrary is very sparsely populated by mobile repeater telephones it is very important that all mobile repeater telephones are functional. If one set of receiver, transmitter and repeater malfunctions in a mobile repeater telephone in such an area and an emergency situation occurs the extra set of receiver, transmitter and repeater might save lives as it allows to keep up communication even with one set of receiver, transmitter and repeater down.

FIG. 1 shows a first embodiment of an ad-hoc network 1 with twenty-six mobile repeater telephones. This number is only for illustrative purposes and any number can within the scope of the present invention be implemented in the ad-hoc network.

As indicated with the circle 2 an arbitrary mobile repeater telephone A has a direct connection range 2 corresponding to the radius R of the circle 2. The geometry of a circle 2 is exemplary and shall not be taken as limiting for the extension of the direct connection range, which is influenced by hills and valleys as well as buildings surrounding the mobile repeater telephone. The mobile repeater telephone A could be any mobile repeater telephone.

The circle 2 around the mobile repeater telephone A shows that mobile repeater telephones Ba, Bb, Bc, and Bd are in direct connection range of the mobile repeater telephone A via connection lines 3,4,5,6, respectively. Within the same direct connection range 2 around the mobile repeater telephones Ba, Bb, Bc, and Bd as around A, the mobile repeater telephone Ba is also in direct connection range of the mobile repeater telephone Bb via a connection 7, Bb of Bc via a connection 8, and Bc of Bd via a connection 9.

Mobile repeater telephones Ca and Cb are in direct connection range of the mobile repeater telephone Ba via connections 10 and 11, respectively, Cc of Bc via a connection 12, Cd and Ce of Bd via connections 13 and 14, respectively, and to each other via a connection 15. So the mobile repeater telephones Ca, Cb, Cc, Cd, and Ce are at a distance of one mobile repeater telephone from mobile repeater telephone A.

Mobile repeater telephones Da, Db, Dc, Dd, De, and Df are at a distance of two mobile repeater telephones from mobile repeater telephone A. The mobile repeater telephones Da and Db are directly connected to mobile repeater telephone Ca via connections 16 and 17, respectively, Dc to Cb via a connection 18, Dd to Cc via a connection 19, De to Cd via a connection 20, and Df to Ce via a connection 21.

Mobile repeater telephones Ea, Eb, Ec, Ed, Ee, Ef, and Eg are at a distance of three mobile repeater telephones from mobile repeater telephone A. The mobile repeater telephone Ea is directly connected to the mobile repeater telephone Da via a connection 22, Eb to Db via a connection 23, Ec and Ed to Dd via connections 24 and 25, respectively, and to each other via a connection 26, Ee to De via a connection 27, Ef and Eg to Df via connections 28 and 29, respectively, and Eg also to Ea via a connection 30.

Mobile repeater telephones Fa, Fb, and Fc are at a distance of four mobile repeater telephones from mobile repeater telephone A. The mobile repeater telephones Fa and Fb are directly connected to mobile repeater telephone Ed via connections 31 and 32, respectively, and to each other via a connection 33 and Fc to Ee via a connection 34.

Also shown in FIG. 1 are a first cellular telephone network 35 and a second cellular telephone network 36 with a first cellular telephone antenna tower 37 and a second cellular telephone antenna tower 38 and a third cellular telephone antenna tower 39 and a fourth cellular telephone antenna tower 40, respectively. The first cellular telephone antenna tower 37 and the second cellular telephone antenna tower 38 are connected to the rest of the first cellular telephone network 35 via connections 41 and 42, respectively. The third cellular telephone antenna tower 39 and the fourth cellular telephone antenna tower 40 are connected to the rest of the second cellular telephone network 36 via connections 43 and 44, respectively.

A first stationary telephone 45 connects via a connection 46 to a first stationary telephone network 47. The first stationary telephone network 47 and the first cellular telephone network 35 is connected via connection 48 between. A first IP telephone 49 indicated by a first headset 50 connects by connection 51 to a first computer 52 connected to the Internet 53a via a connection 54 and to the first cellular telephone network 35 via a connection 55. A first cellular telephone 56 connects to the first cellular telephone network 35 via a connection 57, the first cellular telephone antenna tower 37, and the connection 41.

Likewise, a second stationary telephone 58 is connected via a connection 59 to a second stationary telephone network 60. The second stationary telephone network 60 and the second cellular telephone network 36 are connected via connection 61. A second IP telephone 62 indicated by a second headset 63 connects by connection 64 to a second computer 65 connected to the Internet 53b via a connection 66 and to the second cellular telephone network 36 via a connection 67. A second cellular telephone 68 connects to the second cellular telephone network 36 via a connection 69, the third cellular telephone antenna tower 39, and the connection 43.

A third cellular telephone network (not shown) includes a fifth cellular telephone antenna tower 70. The third cellular telephone network is connected to stationary telephones (not shown), IP telephones (not shown) and cellular telephones (not shown).

Each of the cellular networks may consist of more than one cellular network. This will be necessary if the first, second, and third cellular telephone antenna towers belong to different networks or are placed in different countries.

A repeater 71 connects via connection 72 to a third computer 73 with access 74 to the Internet 53c. The three boxes 53a,53b,53c symbolizing the Internet is just one and the same but is shown as separate items for illustrative purposes.

FIG. 1 shows an instant picture of the first ad-hoc network 1. At this instant the second cellular telephone antenna tower 38 is in direct connection to mobile repeater telephone De via connection 75. The fourth cellular telephone antenna tower 40 is in direct connection to mobile repeater telephone Da via connection 76 and the fifth cellular telephone antenna tower 70 is in direct connection to mobile repeater telephones Fa and Fb via connections 77 and 78, respectively. At this instant the repeater 71 connected to the third computer 73 is in direct connection to mobile repeater telephones Cb and Eb via connections 79 and 80, respectively.

A second ad-hoc network 81 has just two mobile repeater telephones Ga and Gb. The mobile repeater telephone Ga is connected to the mobile repeater telephone Gb via direct connection 82 and to the third cellular telephone antenna tower 39 via direct connection 83.

The first ad-hoc network 1 and second ad-hoc network 81 together with the first 35, second 36 and third cellular telephone network as well as the first 47 and second 60 stationary telephone network and the first 49 and second 62 IP telephones give many different possibilities for calling.

The first telephone connection line between the mobile repeater telephones Ee and Db passes the mobile repeater telephones Ef, De, Cd, Bd, A, Ba and Ca via the direct connections 27,20,13,6,3,10,17.

At the same time the mobile repeater telephone A establish the second telephone connection line to the mobile repeater telephone Fc via the mobile repeater telephones Bd, Cd, De, and Ee and the direct connections 6,13,20,27,34.

Emphasizing that the Internet 53a, Internet 53b, and Internet 53c are in fact the same, the first caller telephone could also be the first IP telephone 49 that connects via the connection 54, Internet 53a, the connection 55, the first cellular telephone network 35, the connection 42 and the second cellular telephone antenna tower 38 to the mobile repeater telephone De via the direct connection 75 and then further to mobile repeater telephone Db passing the mobile repeater telephones Cd, Bd, A, Ba and Ca and the direct connections 20,13,6,3,10,17. The first IP telephone could also connect to the mobile repeater telephone Db via the connection 54, Internet 53a, Internet 53b, the connection 67, the second cellular telephone network 36, the connection 44, the fourth cellular telephone antenna tower 40, the direct connection 76 and the mobile repeater telephones Da and Ca as well as the direct connections 16,17.

In a third exemplary possible configuration, the first IP telephone 49 connects in the first telephone connection line to the mobile repeater telephone Db via the connection 54, Internet 53a, Internet 53c, the connection 74, the third computer 73, the connection 72, the repeater 71, the direct connection 80, the mobile repeater telephone Eb, as well as direct connection 23. The mobile repeater telephone A is still able to establish the second telephone connection line to any of the other mobile repeater telephones in the first ad-hoc network or to the second IP telephone 62, the first 56 or second 68 cellular telephone, the first 45 or second 58 stationary telephone outside the first ad-hoc network 1, due to the fact that the receiver, the repeater and the transmitter can connect more than on phone call.

The first stationary telephone 45 establishes the first telephone connection line to the mobile repeater telephone Bc via the connection 46, the first stationary telephone network 47, the connection 48, first cellular network 35, the connection 42, the second cellular telephone antenna tower 38, the direct connection 75 and the mobile repeater telephones De, Cd, and Bd and the direct connections 20,13,9.

Figure 2:
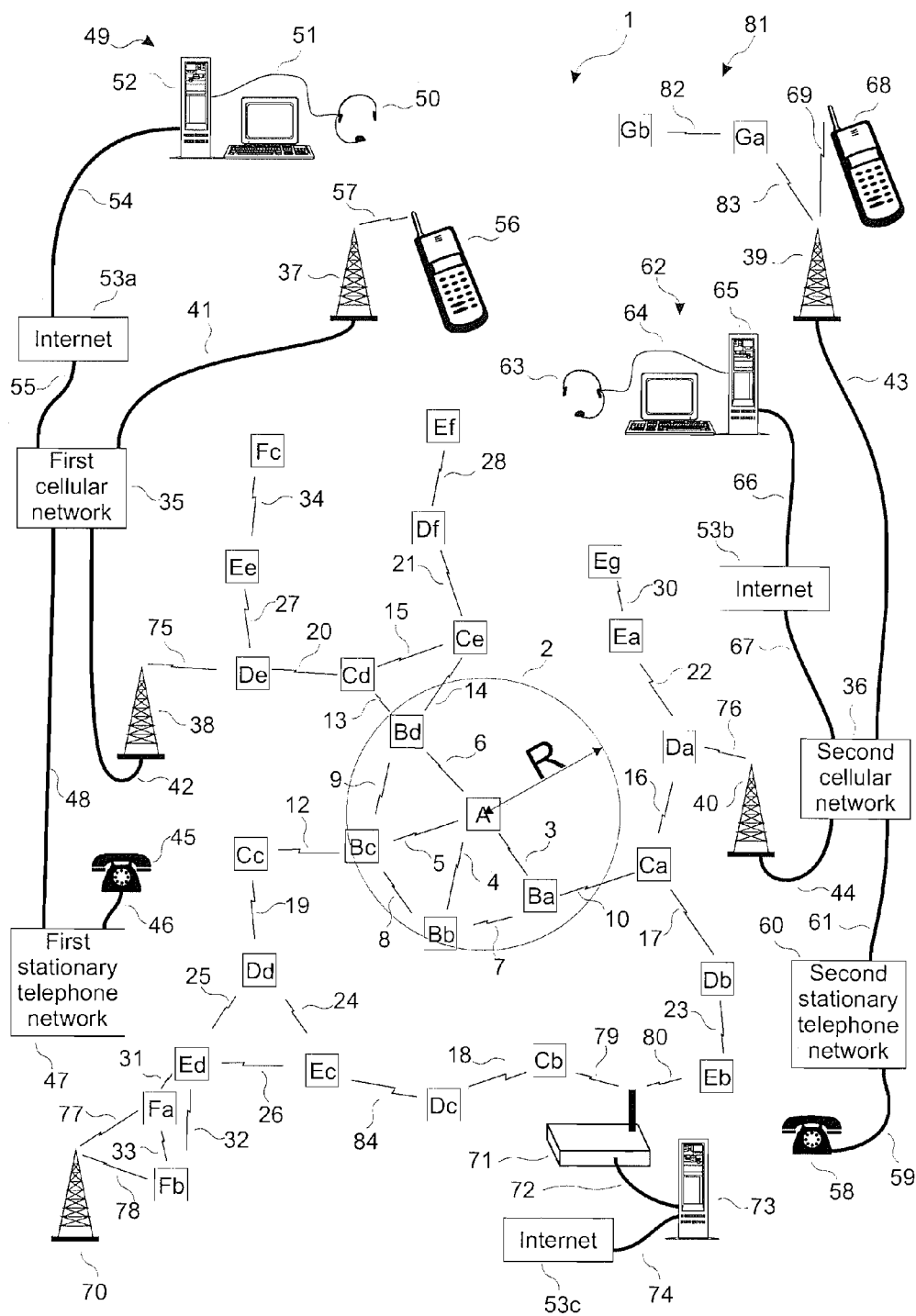
FIG. 2 shows the same ad-hoc network but in another mode.

The mobile repeater telephone Bd establishes the first telephone connection line to the mobile repeater telephone Eg via the mobile repeater telephones Ce and Df and the direct connections 14,21,29. In a next instant, as shown in FIG. 2, the mobile repeater telephone Df has moved away from the mobile repeater telephone Eg and the direct connection 29 is broken. But since the mobile repeater telephones has e.g. a PS receiver each and the mobile repeater telephone Bd knows where the other mobile repeater telephones are, a new connection between the mobile repeater telephones Bd and Eg is immediately established via the mobile repeater telephones A, Ba, Ca, Da, Ea and the direct connections 6,3,10,16,22,30. The new connection between the mobile repeater telephones Bd and Eg could also be established when the signal strength between any of the mobile repeater telephones connecting the mobile repeater telephones Bd and Eg falls below a certain pre-selected level. In that way a good speech quality can be kept.

In the next instant, as shown in FIG. 2, the mobile repeater telephone Dc has moved closer to the mobile repeater telephone Ec and there is a direct connection 84 established between them.

In FIG. 1 the mobile repeater telephone Dc establishes the first telephone connection line to the mobile repeater telephone Ca via the mobile repeater telephones Cb and Ba and the direct connections 18,11,10. In the next instant, as shown in FIG. 2, the mobile repeater telephone Cb has moved away from the mobile repeater telephone Ba and the direct connection 11 is broken. But a connection between the mobile repeater telephones Dc and Ca is immediately established via the mobile repeater telephones Cb, Eb, and Db, including the repeater connected to the third computer, and the direct connections 18,79,80,23,17.

In another example the mobile repeater telephone Gb in FIG. 1 is the first caller telephone connecting to the mobile repeater telephone Ea as the first receiver telephone via the direct connection 82, the mobile repeater telephone Ga, the direct connection 83, the third cellular telephone antenna tower 39, connection 43, the second cellular network 36, connection 44, the fourth cellular telephone antenna tower 40, the direct connection 76, the mobile repeater telephone Da and the direct connection 22. At the same time the mobile repeater telephone Ga is the second caller telephone connecting to the mobile repeater telephone Da as the second receiver telephone via the direct connection 83, the third cellular telephone antenna tower 39, connection 43, the second cellular network 36, connection 44, the fourth cellular telephone antenna tower 40, the direct connection 76.

Figure 3:
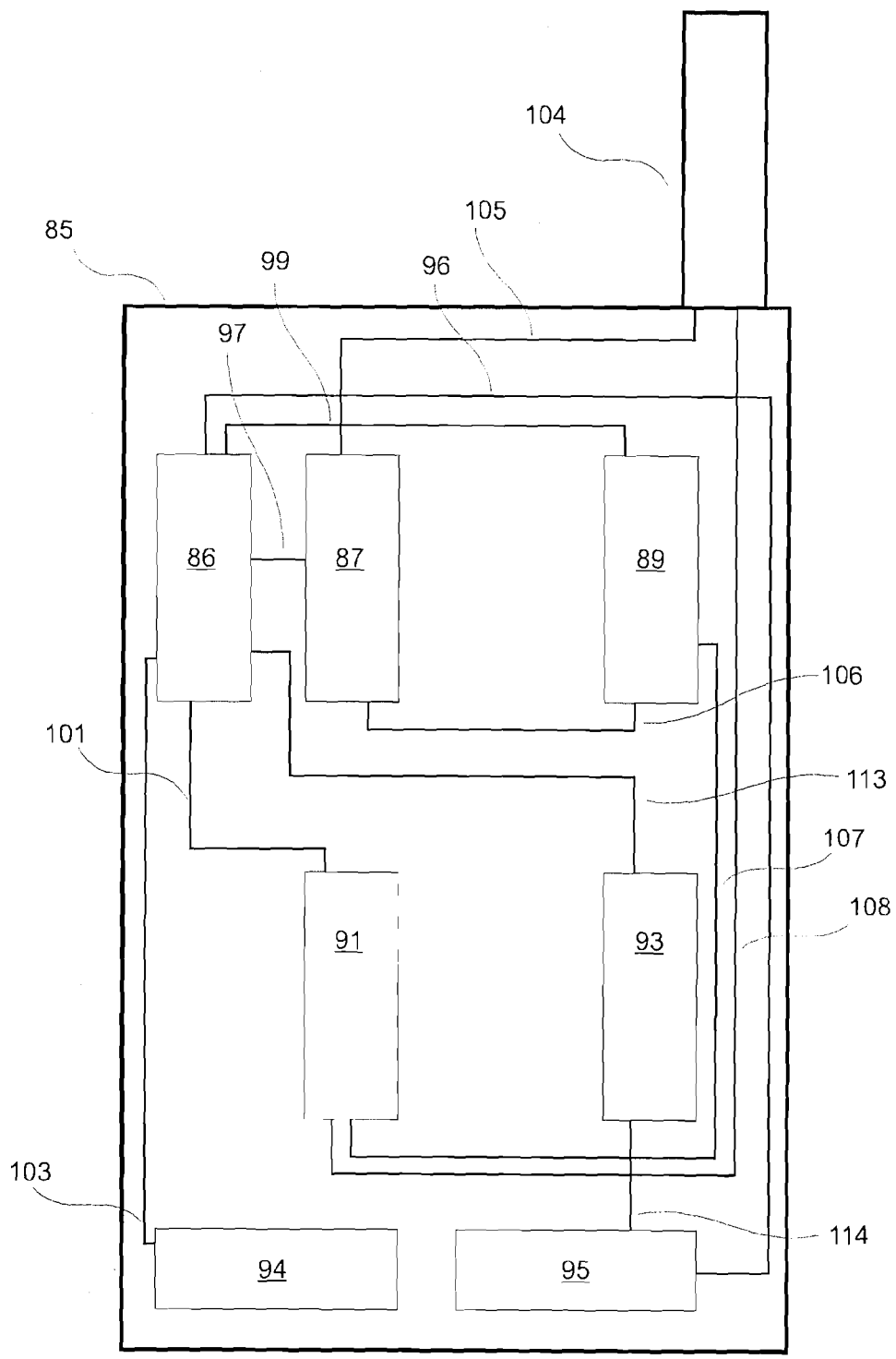
FIG. 3 shows a mobile repeater telephone according to the present invention.

In FIG. 3 the contents of a mobile repeater telephone 85 is disclosed. There is a processor 86, a receiver 87, a repeater 89, a transmitter 91, a PS receiver 93, a memory 94 for storing information about unique code, position and neighbors of the mobile repeater telephones A,Ba,Bb,Bc,Bd,Ca,Cb,Cc,Cd, Ce,Da,Db,Dc,Dd,De,Df,Ea,Eb,Ec,Ed,Ee, Ef,Eg,Fa,Fb,Fc, Ga,Gb in the ad-hoc network 1,81, and a battery 95. The processor 86 is connected to and receives energy from the battery 95 through connection 96. The processor 86 controls and delivers energy to the receiver 87 through connection 97, to the repeater 89 through connection 99, to the transmitter 91 through connection 101, and to the memory 94 through a connection 103.

When the signal of the first call is received by the receiver 87 through an antenna 104 and a connection 105, the first call is sent to the repeater 89 through a connection 106. The repeater 89 increases the signal-to-noise ratio of the signal of the first call and boosts the overall intensity of the signal of the first call. The boosted signal of the first call reduced of noise is sent to the transmitter 91 through a connection 107 and then out into the ether via a connection 108 and the antenna 104 to a next mobile repeater telephone in a first telephone connection line, to a repeater, to a cellular telephone antenna tower, or to a first receiver telephone.

When the signal of the second call is received the signal of the second call will be received, processed and transmitted exactly like the signal of the first call using the same receiver, repeater and transmitter. The first and the second call and maybe further other calls can e.g. be divided by being processed at different frequencies or at different time slots, where each time slot is very short.

The mobile repeater telephone 85 can also be the second caller telephone or the second receiver telephone.

The processor 86 is also connected to the PS receiver 93 through connections 113. The PS receiver 93 gets power from the battery 95 via a connection 114. If the PS receiver 93 is a GPS receiver, the GPS receiver receives signals from the satellites that tell the position of the GPS receiver. The information about the position is stored in the memory 94.

The information about the position of the mobile repeater telephone 85 is sent through the transmitter 91 to at least a subset of the mobile repeater telephones in the ad-hoc network 1,81.

In the processor 86, software about the topography, buildings, walls, etc. in the area of the ad-hoc network is stored. The processor can also comprise software to calculate the attenuation of the signal between two mobile repeater telephones depending on their position. The processor can also comprise means e.g. in the form of software that based on the calculated attenuations between different positions and based on how the mobile repeater telephones move calculates the probability that the connection between two mobile repeater telephones will break. The mobile repeater telephones may comprise means that if the calculations show that a break will probably occur in 15 minutes, in 10 minutes, in 5 minutes, in 2 minutes, in 1 minute, or in 30 seconds the mobile repeater telephone will connect to another mobile repeater telephone and in that way maintain the conversation.

The information about the positions of at least a subset of the mobile repeater telephones in the ad-hoc network 1,81 is received by the receiver 87. The information about the positions of at least a subset of the mobile repeater telephones in the ad-hoc network 1,81 are compared to the stored topography, buildings, walls, etc. on the processor and it is calculated which mobile repeater telephones that are neighbors. The information about which mobile repeater telephones that are neighbors is stored in the memory 94.

Figure 4:
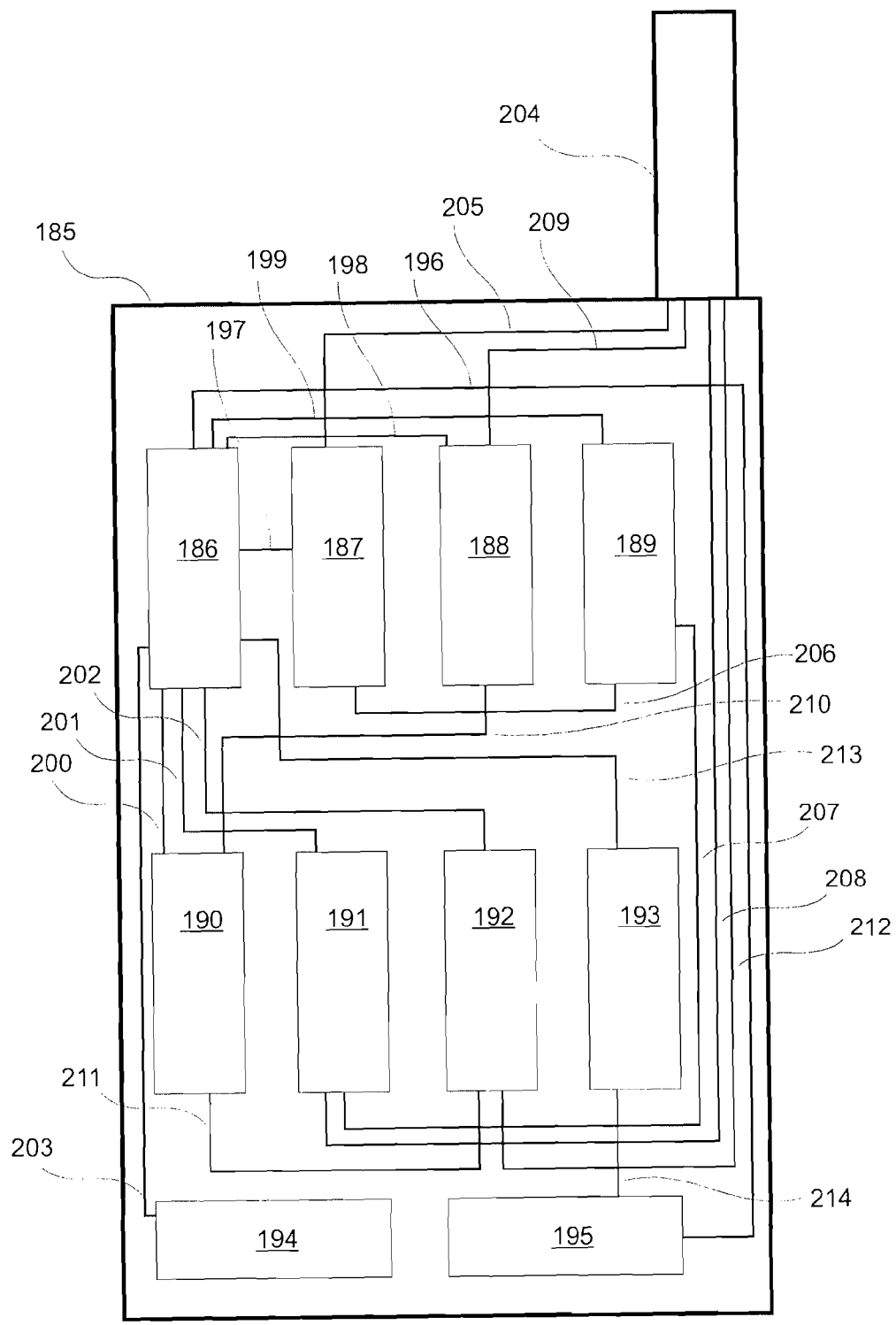
FIG. 4 shows another mobile repeater telephone according to the present invention.

In FIG. 4 the contents of a mobile repeater telephone 185 is disclosed. There is a processor 186, a first receiver 187, a second receiver 188, a first repeater 189, a second repeater 190, a first transmitter 191, a second transmitter 192, a PS receiver 193, a memory 194 for storing information about unique code, position and neighbors of the mobile repeater telephones A,Ba,Bb,Bc,Bd,Ca,Cb,Cc,Cd,Ce,Da,Db,Dc,Dd, De,Df,Ea,Eb,Ec,Ed,Ee, Ef,Eg,Fa,Fb,Fc,Ga,Gb in the ad-hoc network 1,81, and a battery 195. The processor 186 is connected to and receives energy from the battery 195 through connection 196. The processor 186 controls and delivers energy to the first 187 and the second 188 receivers through connections 197 and 198, respectively, to the first 189 and second 190 repeaters through connections 199 and 200, respectively, to the first 191 and second 192 transmitter through connections 201 and 202, respectively, and to the memory 194 through a connection 203.

When the signal of the first call is received by the first receiver 187 through an antenna 204 and a connection 205, the first call is sent to the first repeater 189 through a connection 206. The first repeater 189 increases the signal-to-noise ratio of the signal of the first call and boosts the overall intensity of the signal of the first call. The boosted signal of the first call reduced of noise is sent to the first transmitter 191 through a connection 207 and then out into the ether via a connection 208 and the antenna 204 to a next mobile repeater telephone in a first telephone connection line, to a repeater, to a cellular telephone antenna tower, or to a first receiver telephone.

When the signal of the second call is received by the second receiver 188 through the antenna 204 and a connection 209, the second call is sent to the second repeater 190 through a connection 210. The second repeater 190 increases the signal-to-noise ratio of the signal of the second call and boosts the overall intensity of the signal of the second call. The boosted signal of the second call reduced of noise is sent to the second transmitter 192 through a connection 211 and then out into the ether via a connection 212 and the antenna 204 to a next mobile repeater telephone in a second telephone connection line, to a repeater, to a cellular telephone antenna tower, or to a second receiver telephone.

The mobile repeater telephone 185 can also be the second caller telephone or the second receiver telephone.

The processor 186 is also connected to the PS receiver 193 through connections 213. The PS receiver 193 gets power from the battery 195 via a connection 214. If the PS receiver 193 is a GPS receiver, the GPS receiver receives signals from the satellites that tell the position of the GPS receiver. The information about the position is stored in the memory 194.

The information about the position of the mobile repeater telephone 185 is sent through the first 191 or second 192 transmitter to at least a subset of the mobile repeater telephones in the ad-hoc network 1,81.

In the processor 186, software about the topography, buildings, walls, etc. in the area of the ad-hoc network is stored. The processor can also comprise software to calculate the attenuation of the signal between two mobile repeater telephones depending on their position. The processor can also comprise means e.g. in the form of software that based on the calculated attenuations between different positions and based on how the mobile repeater telephones move calculates the probability that the connection between two mobile repeater telephones will break. The mobile repeater telephones may comprise means that if the calculations show that a break will probably occur in 15 minutes, in 10 minutes, in 5 minutes, in 2 minutes, in 1 minute, or in 30 seconds the mobile repeater telephone will connect to another mobile repeater telephone and in that way maintain the conversation.

The information about the positions of at least a subset of the mobile repeater telephones in the ad-hoc network 1,81 is received by the first 187 or second 188 receiver. The information about the positions of at least a subset of the mobile repeater telephones in the ad-hoc network 1,81 are compared to the stored topography, buildings, walls, etc. on the processor and it is calculated which mobile repeater telephones that are neighbors. The information about which mobile repeater telephones that are neighbors is stored in the memory 194.

The examples of ad-hoc networks and instants given above and illustrated in the figures should not be considered as a limitation of the scope of the present invention as combinations and modifications of the ad-hoc networks are likely to change in number of mobile repeater telephones, how the mobile repeater telephones connect to each other, and which mobile repeater telephones that connect to cellular telephone antenna towers and repeaters.

During a call it should be understood that throughout the application the caller telephone as well as the receiver telephone both sends and transmits signals along the connection line.

The geographical configuration of an ad-hoc network changes all the time because new mobile repeater telephone get out of range and other gets into range, so that old connection lines are broken and new connection lines automatically established. Thus, the ad-hoc network according to present invention is interactive and self-sustained. The invention provides for example an emergency network when an ordinary network is out of order or an alternative network in skip areas without or areas without cabling.

What is claimed is:

1. A method for maintaining a telephone call between mobile repeater telephones in an ad-hoc network, which method comprises:
    comparing positions of the mobile repeater telephones according to its PS receiver (positioning system receiver) to data about the topography of the area of the ad-hoc network on a geographic map in a software program stored on the mobile repeater telephone processor or on a database that is accessible by the mobile repeater telephone and the software program,
        wherein the ad-hoc network comprises a plurality of telephones at least one of which is a mobile repeater telephone for establishing a first telephone connection line between a first caller telephone and a first receiver telephone in the ad-hoc network, wherein at least one mobile repeater telephone has at least one transmitter, at least one receiver, a processor, a PS receiver (positioning system receiver), and at least one repeater for repeating a signal received or transmitted by the at least one mobile repeater telephone for establishing the at least one telephone connection line, wherein the at least one transmitter, the at least one receiver and the at least one repeater simultaneously allow establishing at least one second telephone connection line between at least a second caller telephone and at least one second receiver telephone different from the first caller telephone and the first receiver telephone, respectively, with at least a subset of all the mobile repeater telephones in the ad-hoc network having its own unique code and at least a subset of all the unique codes of the mobile repeater telephones in the ad-hoc network are known to at least the subset of all mobile repeater telephones in the ad-hoc network, and further wherein the software program:
        includes the geographic map in electronic form of the area of the ad-hoc network, and
        includes the data about the topography on the geographic map, and
        has all the obstacles positioned on the geographic map and how much the obstacles attenuate the signal, and
        wherein the mobile repeater telephone connects to another mobile repeater telephone and in that way maintains the conversation if at least one mobile repeater telephone shows that a break will probably occur in 15 minutes, in 10 minutes, in 5 minutes, in 2 minutes, in 1 minute, or in 30 seconds.

2. The method according to claim 1, wherein the positions of the mobile repeater telephones according to the PS receiver are further compared to obstacles positioned on the geographic map and how much the obstacles attenuate the signal.

3. The method according to claim 1, wherein the software gives information whether two mobile repeater telephones are in direct connection or not.

4. The method of claim 1 which further comprises configuring the ad-hoc network by making known the unique code of at least a subset of at least one mobile repeater telephone already in the ad-hoc network to a mobile repeater telephone to be introduced into the ad-hoc network and making known the unique code of the at least one mobile repeater telephone to be introduced into the ad-hoc network to at least a subset of all mobile repeater telephones already in the ad-hoc network.

5. The method according to claim 4, wherein mobile repeater telephone neighbors of at least a subset of mobile repeater telephones already in the ad-hoc network are made known to a mobile repeater telephone to be introduced into the ad-hoc network and mobile repeater telephone neighbors of the mobile repeater telephone to be introduced into the ad-hoc network is made known to at least a subset of all mobile repeater telephones already in the ad-hoc network.

6. The method according to claim 5, wherein two mobile repeater telephones that are neighbors and loose direct contact with each other or two mobile repeater telephones that are not neighbors and establish direct contact with each other make the unique codes of the two mobile repeater telephones and whether the two mobile repeater telephones have lost or have established direct contact with each other known to at least a subset of all mobile repeater telephones in the ad-hoc network.

7. The method according to claim 1, wherein the unique code is a telephone number.

8. The method according to claim 1, wherein a telephone connection line comprises a plurality of mobile repeater telephones in a series wherein at least one of the plurality of mobile repeater telephones also is or is not part of different telephone connection lines.

9. The method according to claim 1, wherein at least a subset of all the mobile repeater telephones in the ad-hoc network acts as serial or parallel transmitters of signal for establishing a telephone connection line.

10. The method according to claim 1, wherein a telephone connection is via Internet protocol telephony via a station with a transmitter, receiver and a repeater connected to a computer or via Voice over Internet protocol.

11. The method according to claim 10, wherein the repeater connected to the computer is a component in establishing a connection between the first or the second caller telephone and the first or the second receiver telephone.

12. The method according to claim 1, wherein the unique code, the position according to the PS receiver and the neighbors of at least a subset of all the mobile repeater telephones are known by at least a subset of the mobile repeater telephones.

13. The method according to claim 1, wherein the mobile repeater telephones communicate as half-duplex devices or walkie-talkies.

14. The method according to claim 1, wherein the software program is adapted to compare the positions of the mobile repeater telephones according to the PS receiver with the geographic map.

15. The method according to claim 1, wherein the software program is adapted to give information about whether two mobile repeater telephones are in direct connection or not.

16. The method according to claim 1, wherein at least one mobile repeater telephone comprises means to ensure that if the calculations show that a break will probably occur in 15 minutes, in 10 minutes, in 5 minutes, in 2 minutes, in 1 minute, or in 30 seconds the mobile repeater telephone may connect to another mobile repeater telephone and in that way maintain the conversation.

17. The method according to claim 16, wherein the mobile repeater telephone has an indicator that shows the power of the signal in a certain direction.

18. The method according to claim 17, wherein a directed antenna directs the signal and increases the power-density of the transmitted signal to the other mobile repeater telephones.

19. The method according to claim 1, wherein the at least one mobile repeater telephone has at least two transmitters, at least two receivers, and at least two repeaters.

20. A method for maintaining a telephone call between mobile repeater telephones in an ad-hoc network, which method comprises:

comparing positions of the mobile repeater telephones according to its PS receiver (positioning system receiver) to data about the topography of the area of the ad-hoc network on a geographic map in a software program stored on the mobile repeater telephone processor or on a database that is accessible by the mobile repeater telephone and the software program, wherein the ad-hoc network comprises a plurality of telephones at least one of which is a mobile repeater telephone for establishing a first telephone connection line between a first caller telephone and a first receiver telephone in the ad-hoc network, wherein at least one mobile repeater telephone has at least one transmitter, at least one receiver, a processor, a PS receiver (positioning system receiver), and at least one repeater for repeating a signal received or transmitted by the at least one mobile repeater telephone for establishing the at least one telephone connection line, wherein the at least one transmitter, the at least one receiver and the at least one repeater simultaneously allow establishing at least one second telephone connection line between at least a second caller telephone and at least one second receiver telephone different from the first caller telephone and the first receiver telephone, respectively, with at least a subset of all the mobile repeater telephones in the ad-hoc network having its own unique code and at least a subset of all the unique codes of the mobile repeater telephones in the ad-hoc network are known to at least the subset of all mobile repeater telephones in the ad-hoc network, and further wherein the software program:

includes the geographic map in electronic form of the area of the ad-hoc network, and includes the data about the topography on the geographic map, and has at least one obstacle positioned on the geographic map and how much the obstacle attenuates the signal, and wherein the mobile repeater telephone connects to another mobile repeater telephone and in that way maintains the conversation if at least one mobile repeater telephone shows that a break will probably occur in 15 minutes, in 10 minutes, in 5 minutes, in 2 minutes, in 1 minute, or in 30 seconds.

* * * * *